Figure 1:
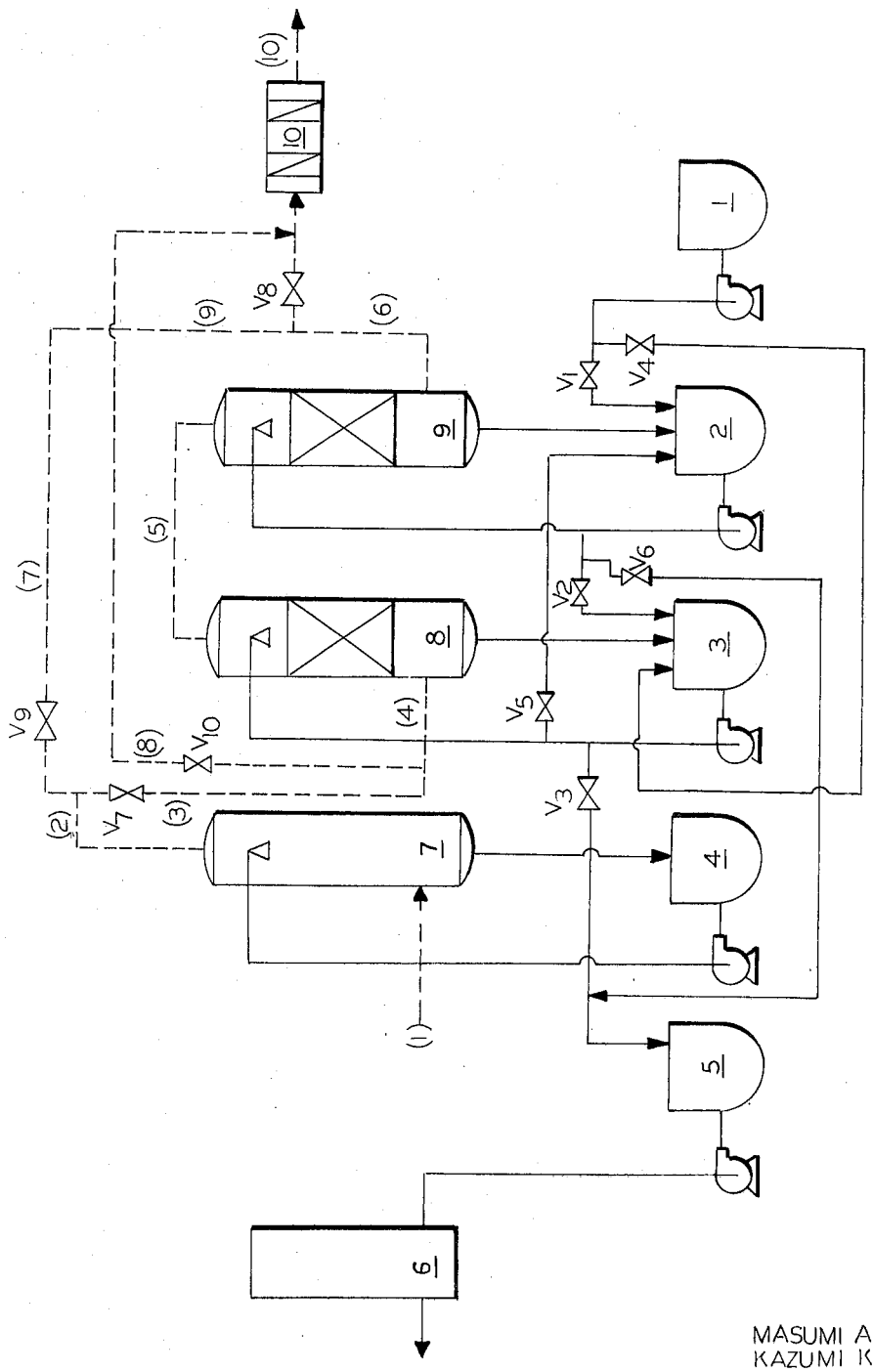

United States Patent [19]
Atsukawa et al.

[11] 3,794,714
[45] Feb. 26, 1974

[54] PROCESS FOR WASHING SULFUR OXIDE-CONTAINING GASES WITH A SLURRY OF LIME

[75] Inventors: Masumi Atsukawa; Kazumi Kamei; Toshihiko Furumoto; Nikushi Tsuneyoshi, all of Hiroshima, Japan

[73] Assignee: Mitsubishi Jukogyo Kabushiki Kaisha, Tokyo, Japan

[22] Filed: Nov. 16, 1971

[21] Appl. No.: 199,213

[30] Foreign Application Priority Data
Dec. 29, 1970  Japan............................. 45/128031

[52] U.S. Cl. ................................................ 423/242
[51] Int. Cl. ............................................ C01b 17/60
[58] Field of Search ........................... 423/242, 215

[56] References Cited
UNITED STATES PATENTS
2,080,779   5/1937   Lessing .............................. 423/242
2,090,142   8/1937   Nonhebel et al. .................. 423/242
2,090,143   8/1937   Nonhebel et al. .................. 423/242
2,233,841   3/1941   Lepsoe ............................... 423/242

*Primary Examiner*—Oscar R. Vertiz
*Attorney, Agent, or Firm*—Wenderoth, Lind and Ponack

[57] ABSTRACT

A process for washing a sulfur oxide-containing gas with a slurry of lime, comprising passing the gas from a first absorbing unit to a second absorbing unit while passing a sulfur oxide absorbing liquid from the second absorbing unit to the first absorbing unit, and occasionally reversing the flow directions of the gas and the absorbing liquid, whereby attachment of a scale to the inner surfaces of said absorbing units is prevented.

2 Claims, 2 Drawing Figures

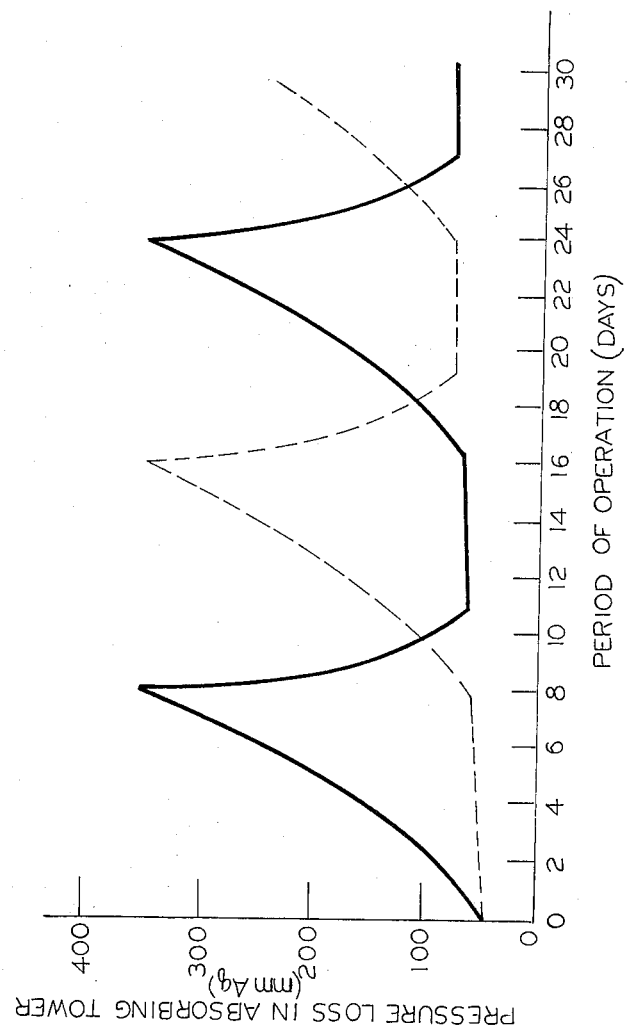

PROCESS FOR WASHING SULFUR OXIDE-CONTAINING GASES WITH A SLURRY OF LIME

This invention relates to a method of preventing the formation of scale in the process of removing sulfur oxide from waste flue gases in two or more sulfur oxide absorbing units by using lime as absorbent. More specifically the present invention relates to a method of substantially preventing the attachment of a scale onto the inner surface of an absorbing unit in which a gas absorbing liquid is maintained at a relatively high pH value for the purpose of completely removing sulfur oxide from the waste flue gas by periodically switching the directions of the flow of the waste flue gas and the absorbing liquid and dissolving the scale with the absorbing liquid supplied into said absorbing unit from the other absorbing unit; said absorbing liquid having been previously reacted with the waste flue gas of high sulfur oxide concentration for obtaining a high conversion of sulfur oxide. This absorbing liquid is maintained at a relatively low pH value and hence has excellent scale dissolving power.

Recently the use of a suspension of lime or calcium carbonate which is easy to procure and inexpensive, is being reconsidered as an absorbing liquid to be used for the removal of sulfur oxide from waste flue gases, which sulfur dioxide is the main cause of atmospheric pollution. However, since the calcium sulfite formed by the absorption of sulfur oxide and the lime or calcium carbonate used as absorbent are all low in solubility, a scale is formed in a relatively short period of time on the inner surface of the absorbing towers and the surface of the filler disposed in said towers on the inner surface of conduits, resulting in an increasing pressure loss within the towers, clogging of the conduits and a decrease in absorbing efficiency.

The methods which are widely employed at the present time for removing the scale, are to wash off the scale chemically with a washing liquid and to remove the scale mechanically by a brush or scraper. However, these methods all necessitate the interruption of the sulfur oxide absorbing operation and, when the chemical washing method is employed, the cost of the chemical used adds to the operational cost of the process as the rate of the scale formation is relatively high. Furthermore, the costs of piping, meters, tanks and pumps associating with the chemical washing liquid, renders the desulfurization plant extremely expensive.

In the method of this invention, the flow directions of the waste flue gas and the absorbing liquid are periodically switched during operation of a conventional desulfurizing apparatus by using conduits added to said apparatus, whereby the scale already attached to the various surfaces can be readily removed and the formation of new scale substantially prevented. Therefore, the method of this invention has several advantages in that the desulfurizing process need not be interrupted and can be operated continuously for a long period of time and also in that the above-described defects associated with the conventional methods can be eliminated.

According to the present invention, it is possible to eliminate the need for removing scale has heretofore been necessary two to three times a month in the conventional method and it is also possible to operate the desulfurizing process continuously for an extended period of time without a reduction of the sulfur oxide absorbing capacity.

In order to make more explicit the features and advantages of the present invention, a mode of practicing the method of invention will be explained with reference to the accompanying drawings. In the drawings, FIG. 1 is a schematic diagram exemplifying an apparatus for practicing the method of this invention and FIG. 2 is a graph for explaining the effects of the method of the invention.

Referring to FIG. 1, the dotted lines indicate the flow of a waste flue gas in flue gas passage ducts (1)–(10) and the solid lines the flow of an absorbing liquid.

When valves $V_1$, $V_2$ and $V_3$ provided in the absorbing liquid passage line are held open and valves $V_4$ and $V_5$, also provided in the absorbing liquid passage line, are held closed, and further valves $V_7$ and $V_8$ provided in the flue gas passage line are held open and valves $V_9$ and $V_{10}$, also provided in the flue gas passage line, are held closed, the waste flue gas introduced through duct (1) is humidized and cooled and at the same time, dusts are removed therefrom in a cooling tower 7 by a spray of circulating water, from tank 4 and then led into a first absorbing tower 8 through ducts (2), (3) and (4). The first absorbing tower 8 is intended to complete the reaction of the absorbing liquid therein and the flue gas is contacted by the absorbing liquid supplied from a second absorbing tower 9 via tanks (2) and (3), in which the reaction represented by reaction formula (1) has fairly advanced, and as a result the conversion of the absorbing liquid rises to 95 percent or higher.

In this state, the pH of the absorbing liquid is maintained below 4 as a result of the reactions represented by reaction formulae (2) and (3), and part of the calcium sulfite is oxidized with a small quantity of oxygen present in the flue gas, and converted into gypsum as represented by reaction formula (4). However, since the oxidation period is not long enough for the growth of crystals and the quantity of gypsum formed is relatively small, only a small quantity of a scale, consisting essentially of gypsum, attaches to the inner wall of the first absorbing tower. Furthermore, since the absorbing liquid in the first absorbing tower dissolves calcium sulfite to a degree more than 100 times that of the absorbing liquid in the second absorbing tower, substantially no calcium sulfite attaches to the inner wall of the first absorbing tower and hence there are no scale problems in the first absorbing tower.

The flue gas leaving the first absorbing tower is led through a duct (5) into a second absorbing tower 9 which is intended to remove sulfur oxide from the flue gas at a high percentage therein. In the second absorbing tower, the flue gas is contacted by an absorbing liquid of a high pH value supplied from an absorbing liquid preparation tank 1 via tank 2 and the sulfur oxide present in the flue gas is substantially entirely removed therefrom by the reaction represented by formula (1). As a result, the pH of the absorbing liquid is maintained above 7 due to the presence of unreacted lime or calcium carbonate, and therefore, the oxidation reaction represented by reaction formula (4) does not substantially proceed. However, since the solubilities of calcium sulfite and calcium carbonate at said pH of the absorbing liquid are extremely low, a soft scale consisting essentially of calcium sulfite and calcium carbonate attaches concentrically to that portions of the inner wall of the absorbing tower where the flow of the absorbing liquid is non-uniform and also to that portions of the surface of the filler adjacent the inner wall of the absorbing tower.

The formation of a scale on the inner wall of the second absorbing tower results in an increased pressure loss within the tower, however the degree of scaling can be readily ascertained by measuring the pressure loss. Therefore, before the pressure loss exceeds an allowable value, the valves $V_1$, $V_2$ and $V_3$ are closed and the valves $V_4$ and $V_5$ are opened in the absorbing liquid passage line, and at the same time, the valves $V_9$ and $V_{10}$ are opened and the valves $V_7$ and $V_8$ are closed in the flue gas passage line, so as thereby to switch the flow directions of the flud gas and the absorbing liquid. Upon completion of this, the second absorbing tower before the switching serves as the first absorbing tower and the absorbing liquid capable of easily dissolving the calcium sulfite and which has a low pH value circulates therein, and further the flue gas of high sulfur oxide concentration passes therethrough. Therefore, the calcium carbonate, the main component of the scale attached to the wall of said absorbing tower is converted into calcium sulfite through the reaction represented by the reaction formula (1), and the calcium sulfite thus formed is gradually dissolved and removed by the absorbing liquid. Thus, the attachment of the scale is substantially prevented by this method.

The flue gas processed through the second absorbing tower is passed through a mist separator 10 and released into the atmosphere. On the other hand, the absorbing liquid in which the reaction has been completed and which is emerging from the first absorbing tower is led into an oxidizing tower 6 through a tank 5, in which it is completely oxidized through the reaction represented by the reaction formula (4). The reactions which occur in the process are as follows:

$$Ca(OH)_2 + CO_2 \rightarrow CaCO_3 + H_2O$$

$$Ca(OH)_2 + SO_2 \rightarrow CaSO_3 \cdot \tfrac{1}{2}H_2O + \tfrac{1}{2}H_2O \quad \Big\} (1)$$

$$CaCO_3 + SO_2 + \tfrac{1}{2}H_2O \rightarrow CaSO_3 \cdot \tfrac{1}{2}H_2O + CO_2$$

$$SO_2 + H_2O \rightarrow H_2SO_3 \quad (2)$$

$$H_2SO_3 \rightarrow H^+ + HSO_3^- \quad (3)$$

$$CaSO_3 \cdot \tfrac{1}{2}H_2O + O_2 + 1\tfrac{1}{2}H_2O \rightarrow CaSO_4 \cdot 2H_2O \quad (4)$$

Example

Using the apparatus shown in FIG. 1, a waste flue gas containing 0.15 percent by volume of sulfur oxide from the combustion of heavy oil was treated at a rate of 2,000 Nm³ per day by the wet lime process. In operating the process, the limited pressure loss was set at 400 mm $H_2O$ and the flow directions of the flue gas and an absorbing liquid were switched every 192 hours to prevent the attachment of a scale. The apparatus was continuously operated for 30 days which is three times as long as possible by the conventional method, without encountering a scale trouble and an average desulfurizing ratio of higher than 95 percent was obtained. In the operation, the normal pressure loss restoring time after switching the flow directions was 72 hours.

Table 1 given below shows the measured solubility of calcium sulfite in the absorbing liquid which is in the state of equilibrium at a low pH value. It has been seen that the solubility of calcium sulfite in the absorbing liquid at a pH of 3.9 – 4.0 is about 130 – 140 times that in the absorbing liquid at a pH of 6.5.

TABLE 1.—SOLUBILITY OF CALCIUM SULFITE

| | | | |
|---|---|---|---|
| Concentration of $SO_2$ in a suspension containing 6% by weight of calcium sulfite (mol/l) | 0.033 | 0.028 | 0 |
| pH | 3.9 | 4.0 | 6.5 |
| Concentration of dissolved calcium (g/l) | 1.40 | 1.32 | 0.01 |

Table 2 given below shows the detailed operational conditions.

TABLE 2.—OPERATIONAL CONDITIONS

| Waste flue gas | | | | Absorbing liquid | | | | | |
|---|---|---|---|---|---|---|---|---|---|
| | | | | | Circulation rate | | | pH | |
| Flow rate, Nm³/H | Inlet temperature, °C. | Outlet temperature, °C. | Concentration of $SO_2$ vol, percent | Concentration of absorbent wt, percent | First tower, m³/H | Second tower, m³/H | Quantity replenished, l/H | First tower | Second tower |
| 2000 | 130 | 60 | 0.15 | 6 | 10 | 10 | 120 | 4 | 9 |

FIG. 2 is a graph showing the substantial scale attachment preventing effect of the method of this invention in terms of pressure loss within the absorbing tower. The solid lines of the graph represent the pressure loss in the first absorbing tower and the dotted lines the pressure loss in the second absorbing tower.

What is claimed is:

1. A process of removing sulphur dioxide from a waste flue gas with a lime slurry absorbing liquid, comprising passing the waste gas to a first absorbing unit and then from the first absorbing unit to a second absorbing unit while passing the lime slurry absorbing liquid from the second absorbing unit to the first absorbing unit and reversing the flow directions of the gas and absorbing liquid before the pressure loss resulting from the formation of scale on the inner wall of the second absorbing unit exceeds 400 mm $H_2O$ in said second absorbing unit, and reversing this procedure, depending on the aforementioned pressure loss in the respective absorbing units, so as to avoid the build-up of scale consisting predominantly of calcium carbonate.

2. A process according to claim 1 wherein the absorbing liquid used in the first absorbing unit has a pH below 4 wherein the absorbing liquid used in the second absorbing unit has a pH of above 7.

* * * * *